US012454131B2

(12) United States Patent
Joboji

(10) Patent No.: US 12,454,131 B2
(45) Date of Patent: Oct. 28, 2025

(54) INK DISCHARGING APPARATUS

(71) Applicant: BROTHER KOGYO KABUSHIKI KAISHA, Nagoya (JP)

(72) Inventor: Rie Joboji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 199 days.

(21) Appl. No.: 18/515,484

(22) Filed: Nov. 21, 2023

(65) Prior Publication Data

US 2024/0173987 A1 May 30, 2024

(30) Foreign Application Priority Data

Nov. 30, 2022 (JP) ................................ 2022-190893

(51) Int. Cl.
*B41J 2/175* (2006.01)

(52) U.S. Cl.
CPC ............. *B41J 2/175* (2013.01); *B41J 2/1752* (2013.01); *B41J 2/17556* (2013.01); *B41J 2/17596* (2013.01)

(58) Field of Classification Search
CPC ...... B41J 2/175; B41J 2/1752; B41J 2/17556; B41J 2/17596; B41J 2/17509; B41J 2/18; C09D 11/32
See application file for complete search history.

(56) References Cited

FOREIGN PATENT DOCUMENTS

JP 2000-309109 A 11/2000
JP 2001315357 A * 11/2001 .......... B41J 2/16523

* cited by examiner

*Primary Examiner* — Justin Seo
(74) *Attorney, Agent, or Firm* — Merchant & Gould P.C.

(57) ABSTRACT

There is provided an ink discharging apparatus including: a tank configured to store an ink; a head configured to discharge the ink supplied from the tank; a supply pipe connecting the tank and the head; a pump arranged in the supply pipe, the pump being configured to transfer the ink from the tank to the head; a pipe branching upward from the supply pipe; and a pressure sensor connected to an upper end part of the pipe. The pipe has an upper tube part and a lower tube part continuous with the upper tube part. A first cross-sectional area of an internal space of the upper tube part is greater than a second cross-sectional area of an internal space of the lower tube part.

9 Claims, 6 Drawing Sheets

INK DISCHARGING APPARATUS

REFERENCE TO RELATED APPLICATIONS

This application claims priority from Japanese Patent Application No. 2022-190893 filed on Nov. 30, 2022. The entire content of the priority application is incorporated herein by reference.

BACKGROUND ART

As an ink discharging apparatus configured to discharge, from a head, an ink supplied from a tank, an ink-jet recording apparatus is known for example. The ink-jet recording apparatus may be provided with a tube branching from a main exhaust tube and a pressure sensor connected to a terminal end of the tube. The pressure sensor may detect the pressure inside the main exhaust tube.

DESCRIPTION

In an ink-jet recording apparatus described in Japanese Patent Application Laid-open No. 2000-309109, in order to detect the pressure inside a supply tube connecting a main tank and a recording head, it is considered, for example, to provide a branching pipe branching from the supply tube and to provide a pressure sensor on a terminal end of the branching pipe. Here, in a case of using a pressure sensor which is designed to make contact only with the air, it is necessary to make the length of the supply tube to be long such that an ink does not adhere to the pressure sensor.

However, in such a case that the inner diameter of the branching pipe is small, a liquid surface of the ink is easily raised due to the capillary phenomenon of the ink and the pressure change (fluctuation) inside the supply tube, and thus the ink is likely to make contact with the pressure sensor. On the other hand, in such a case that the inner diameter of the branching pipe is great, the raising of the liquid surface of the ink due to the capillary phenomenon of the ink does not occur, and thus the liquid surface of the ink becomes low, as compared with the case wherein the inner diameter is small. Due to this, there is such a possibility that the liquid surface of the ink might change (fluctuate), due to the pressure change inside the supply tube, while straddling a connecting part between the branching pipe and the supply tube. Due to this, in a case that the liquid surface of the ink is lowered than the connecting part, there is such a fear that the ink left in the connecting part might be solidified in a state of a thin film, and that the solidified ink might peel off by making contact with the ink newly supplied next time and might flow toward the head. As a result, there is such a fear that the solidified ink might cover a fine-weaved filter inside the head and clog the filter, thereby closing or clogging a channel in which the ink flows in the head.

The present disclosure has been made in view of the above-described situation; an object of the present disclosure is to provide an ink discharging apparatus in which an ink is less likely to make contact with a pressure sensor and the ink is less likely to be left at a connecting part between a branching pipe and a supply pipe.

(1) According to an aspect of the present disclosure, there is provided an ink discharging apparatus including: a tank configured to store an ink; a head configured to discharge the ink supplied from the tank; a supply pipe connecting the tank and the head; a pump arranged in the supply pipe, the pump being configured to transfer the ink from the tank to the head; a pipe (branching pipe) branching upward from the supply pipe; and a pressure sensor connected to an upper end part of the pipe. The pipe has an upper tube part and a lower tube part continuous with the upper tube part. A first cross-sectional area of an internal space of the upper tube part is greater than a second cross-sectional area of an internal space of the lower tube part.

Since the first cross-sectional area of the internal space of the upper tube part is greater than the second cross-sectional area of the internal space of the lower tube part, the change of the liquid surface of the ink due to the pressure change in the internal space of the supply pipe is small in the internal space of the upper tube part. Due to this, even in a case that the pressure in the internal space of the supply pipe becomes great, which in turn raises the liquid surface of the ink in the internal space of the pipe (branching pipe), this ink is less likely to make contact with the pressure sensor. Since the second cross-sectional area of the internal space of the lower tube part is smaller than the first cross-sectional area of the internal space of the upper tube part, the liquid surface of the ink is more likely to raise up to the position of the upper tube part due to the capillary phenomenon. Due to this, the liquid surface of the ink is less likely to change while straddling the connecting part between the lower tube part and the supply tube, and thus the ink is less likely to be left at the connecting part. This suppresses the occurrence of such a situation that the ink left at the connecting part might be solidified and that the solidified ink might peel off by making contact with the ink newly supplied next time and might flow toward the head together with the new ink, which in turn suppresses the occurrence of such a situation that the solidified ink might close or clog the channel in which the ink flows in the head.

(2) The lower tube part may extend over an entire area between the supply pipe and the upper tube part; and a cross-sectional area of the internal space of the lower tube part may be smaller than the first cross-sectional area in the entire area between the supply pipe and the upper tube part.

(3) The cross-sectional area of the internal space of the lower tube part may be the second cross-sectional area in the entire area between the supply pipe and the upper tube part.

(4) The upper tube part may have a tapered part which is positioned at an upper end part of the upper tube part and of which outer diameter is reduced upward. The pressure sensor may be connected to the upper tube part via a tube fitted to an outer periphery of the tapered part.

The pipe (branching pipe) is easily connected to the pressure sensor. In a case that the upper tube part is pulled downward with respect to the tube, the tapered part deeply bites into the inner circumferential surface of the tube, and thus the ink is less likely to leak from a position between the tube and the upper tube part. Since there is provided a gap between the inner circumferential surface of the tube and the tapered part, if the liquid surface of the ink is changed while straddling the upper end part of the upper tube part, there arises such a problem that the ink is more likely to be left in the gap. However, in the internal space of the upper tube part, since the change of the liquid surface of the ink is small, the ink is less likely to reach the upper end of the upper tube part even in a case that the pressure inside the internal space of the supply pipe becomes to be great. Thus, the ink is less likely to be left in the gap.

(5) A third cross-sectional area of an internal space of the tube may be greater than the first cross-sectional area.

The change of the liquid surface of the ink is small in the internal space of the tube than that in the internal space of the upper tube part. Therefore, even in a case that the pressure in the internal space of the supply pipe becomes to be great, the ink is less likely to make contact with the pressure sensor.

(6) A pipe length of the tube may be shorter than a pipe length of the upper tube part.

It is possible to make the apparatus to be small-sized easily, while suppressing such a situation that the ink makes contact with the pressure sensor.

(7) The lower tube part may have a first part integrally formed with the upper tube part, and a connecting part connecting the first part and the supply pipe; and a pipe length of the first part may be shorter than the pipe length of the upper tube part.

The liquid surface of the ink is more likely to be present in the internal space of the upper tube part. An air bubble is less likely to present in the internal space of the lower tube part.

(8) The second cross-sectional area may be smaller than a fourth cross-sectional area of an internal space of the supply pipe.

Since it becomes easier for the ink to rise in the internal space of the lower tube part, the liquid surface of the ink is more likely to be present in the internal space of the upper tube part.

(9) The ink may include a water and resin fine particles dispersed in the water.

The ink is more likely to be solidified due to the dryness. Thus, if the ink is left in the connecting part between the lower tube part and the supply pipe, a solidified ink is more likely to be generated. Accordingly, it is possible to effectively suppress the occurrence of such a situation that the solidified ink might peel off by making contact with the ink newly supplied next time and might flow toward the head together with the new ink so as to close or clog the channel in the head.

According to the present disclosure, the ink is less likely to make contact with the pressure sensor and the ink is less likely to be left at the connecting part between the branching pipe and the supply pipe.

Figure 1:
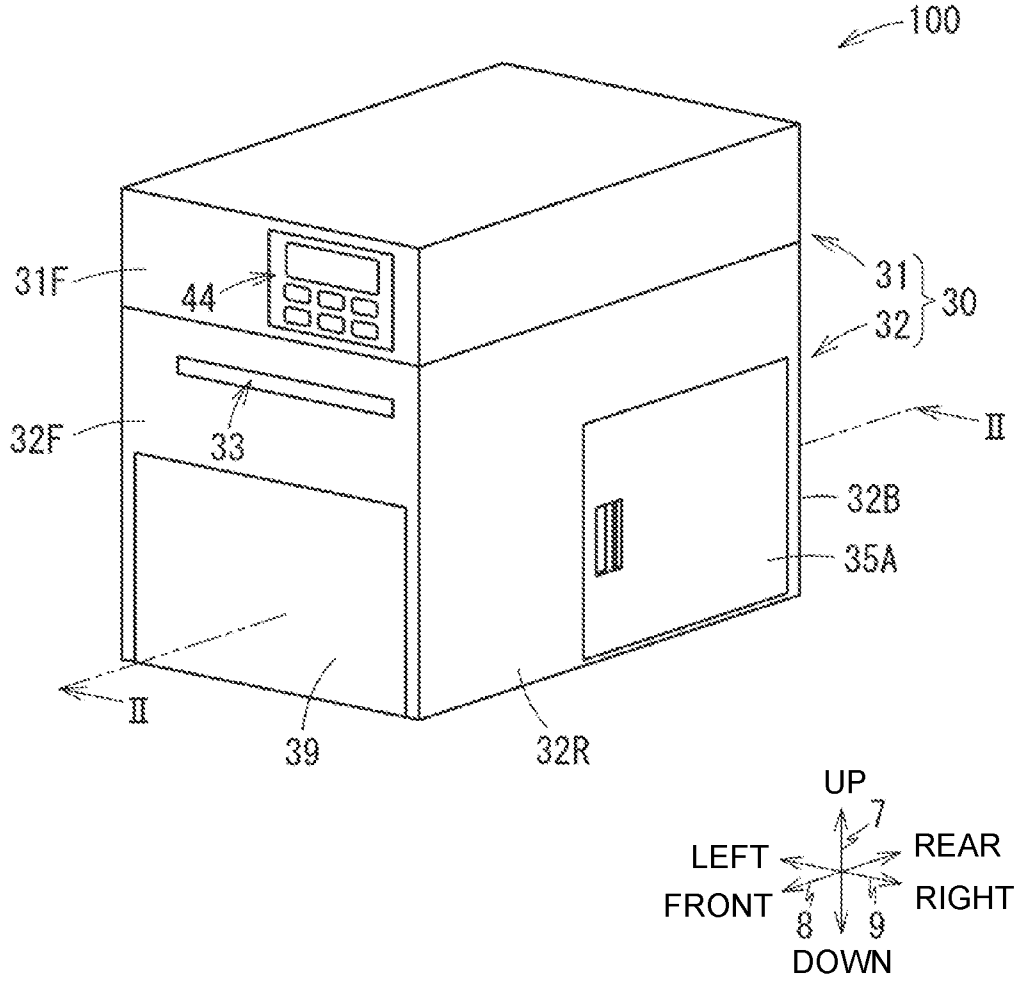
FIG. 1 is a perspective view depicting the outer appearance of an image recording apparatus 100.

In the following, an embodiment of the present disclosure will be described. Note that the present embodiment is merely an aspect of the present disclosure; it is needless to say that the embodiment can be appropriately modified within a range that the gist of the present disclosure is not changed. In the following explanation, an up-down direction 7 is defined based on a state in which an image recording apparatus 100 is installed usably (a state of FIG. 1); a front-rear direction 8 is defined while defining a side on which a discharge port 33 is provided as a front side (front surface); and a left-right direction 9 is defined while seeing the image recording apparatus 100 from the front side (front surface).

<Outer Configuration of Imager Recording Apparatus 100>

The image recording apparatus 100 (an example of an "ink discharging apparatus") as depicted in FIG. 1 records an image on a sheet (paper sheet, paper) S forming a roll body 37 (see FIG. 2), in the ink-jet recording system.

As depicted in FIG. 1, the image recording apparatus 100 is provided with a casing 30. The casing 30 is provided with an upper casing 31 and a lower casing 32. The upper casing 31 and the lower casing 32 have a shape which is generally rectangular parallelepiped as a whole and have a size placeable or arrangeable on a table or desk. That is, the image recording apparatus 100 is suitable to be used by being placed on the table or desk. Of course, the image recording apparatus 100 may be used while being placed on a floor surface, a rack, etc. Note that a frame configured to support respective members or parts may be provided appropriately in the inside of the casing 30.

Figure 2:
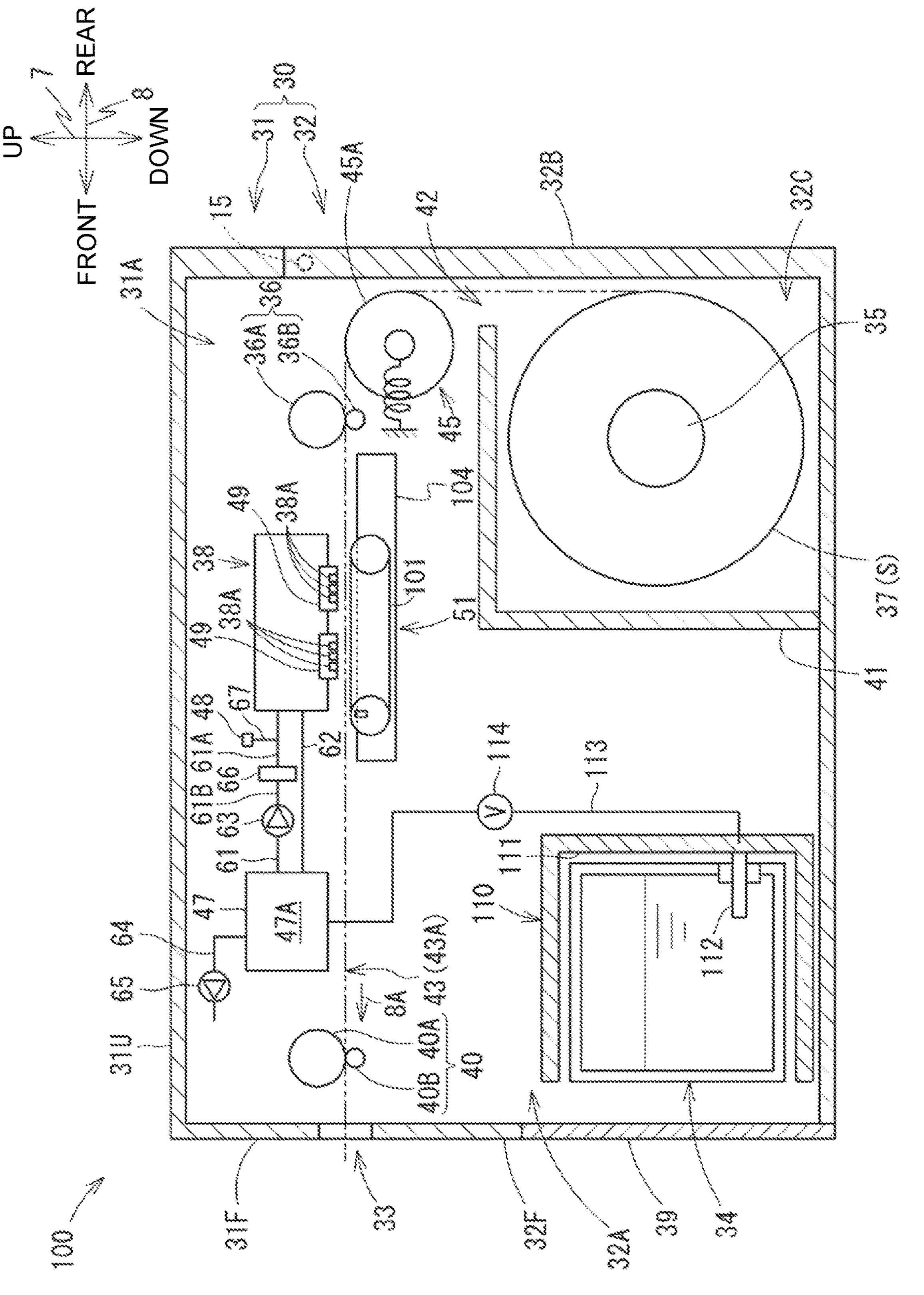
FIG. 2 is a cross-sectional view depicting a II-II cross-section of FIG. 1.

As depicted in FIG. 2, the upper casing 31 is rotatably supported by the lower casing 32. The upper casing 31 is rotatable, about a rotation shaft 15 provided at a rear lower end part of the upper casing 31 and extending in the left-right direction 9, to a closed position depicted in FIG. 2 and to an open position. Note that the configuration by which the upper casing 31 is rotated is not limited to the configuration with the rotation shaft 15; the upper casing 31 may be rotated by, for example, a hinge, etc.

As depicted in FIG. 2, in a case that the upper casing 31 is in the closed position, an internal space 31A of the upper casing 31 and an internal space 32A of the lower casing 32 are shielded with respect to the outside. In a case that the upper casing 31 is in the open position, the internal space 31A of the upper casing 31 and the internal space 32A of the lower casing 32 are exposed with respect to the outside.

As depicted in FIG. 1, the discharge port 33 having a slit shape which is long in the left-right direction 9 is formed in a front wall 32F of the lower casing 32. A sheet S (see FIG. 2) having an image recorded thereon is discharged from the discharge port 33.

An operation panel 44 is provided on the front surface 31F of the upper casing 31. A user performs input, via the operation panel 44, for operating the image recording apparatus 100 or for confirming a variety of kinds of settings.

As depicted in FIG. 1, a right cover 35A is positioned on a right surface 32R of the lower casing 32. By opening or closing of the right cover 35A, a holder 35, etc., positioned in a sheet accommodating space 32C (see FIG. 2) is exposed or shielded.

As depicted in FIG. 1, a front cover 39 is positioned in the front surface 32F of the lower casing 32. The front cover 39 can be opened so that a side of an upper end of the front cover 39 falls frontward about a rotation shaft (not depicted in the drawings) extending in the left-right direction 9 in the vicinity of a lower end of the front cover 39. By opening or closing of the front cover 39, an installment case 110, etc. (see FIG. 2), positioned in the inner space 32A of the lower casing 32 is exposed or shielded.

<Internal Configuration of Image Recording Apparatus 100>

As depicted in FIG. 2, the holder 35, a tensioner 45, a conveying roller pair 36, a conveying roller pair 40, a head unit 38 (an example of a "head"), a platen 51, an ink tank 34, the installment case 110, an ink sub-tank 47 (an example of a "tank"), etc., are arranged in the internal spaces 31A and 32A. Note that although not depicted in the drawings, a fixing unit, an image sensor, a cutter, a maintenance mechanism, etc., may be positioned in the internal space 32A.

A partition wall 41 is provided in the internal space 32A. The partition wall 41 partitions a rear lower part of the internal space 32A so as to define the sheet accommodating space 32C. The sheet accommodating space 32C is a space which is surrounded by the partition wall 41 and the lower casing 32 and which is isolated from the head unit 38, etc.

The tensioner 45 is positioned in a rear part of the internal space 32A and above the partition wall 41. The tensioner 45 has an outer circumferential surface 45A facing the outside of the lower casing 32. The outer circumferential surface 45A has a size which is not less than the maximum width of the sheet in the left-right direction 9, and has a shape symmetrical with respect to the center of the conveyed sheet (the center, in the left-right direction 9, of the sheet S). An upper end of the outer circumferential surface 45A is at a position which is substantially same, in the up-down direction 7, as a nipping position of the conveying roller pair 36.

The sheet S pulled out from the roll body 37 is put or placed on and makes contact with the outer circumferential surface 45A. The sheet S is curved forward along the outer circumferential surface 45A, extends in a conveying orientation 8A, and is guided to the conveying roller pair 36. The conveying orientation 8A is a forward orientation along the front-rear direction 8. The tensioner 45 imparts a tension to the sheet S in a well-known method.

The conveying roller pair 36 is positioned in front of the tensioner 45. The conveying roller pair 36 has a conveying roller 36A and a pinch roller 36B. The conveying roller 36A and the pinch roller 36B make contact with each other at a position in the up-down direction 7 which is substantially same as the upper end of the outer circumferential surface 45A.

The conveying roller pair 40 is positioned in front of the conveying roller pair 36. The conveying roller pair 40 has a conveying roller 40A and a pinch roller 40B. The conveying roller 40A and the pinch roller 40B make contact with each other at a position in the up-down direction 7 which is substantially same as the upper end of the outer circumferential surface 45A.

The conveying rollers 36A and 40A rotate by the driving force transmitted thereto from a non-depicted motor. The conveying roller pair 36 rotates while nipping the sheet S extending in the conveying orientation 8A from the tensioner 45, to thereby feed out the sheet S in the conveying orientation 8A along a conveying surface 43A. The conveying roller pair 40 rotates while nipping the sheet S fed from the conveying roller pair 36, to thereby feed out the sheet S in the conveying orientation 8A. Further, by the rotations of the conveying roller pairs 36 and 40, the sheet S is drawn from the sheet accommodating space 32C via a gap 42 and toward the tensioner 45.

As depicted in FIG. 2, a conveyance path 43 extending from the upper end of the outer circumferential surface 45A and arriving at the discharge port 33 is formed in the internal space 32A. The conveyance path 43 extends substantially linearly along the conveying orientation 8A, and is a space in which the sheet S can pass. Specifically, the conveyance path 43 is along the conveying surface 43A which spreads in the conveying orientation 8A and in the left-right direction 9 and which is long in the conveying orientation 8A. Note that in FIG. 2, the conveying surface 43 A is indicated by a two-dot chain line indicating the conveyance path 43. The conveyance path 43 is defined by guide members positioned away from each other in the up-down direction 7 (not depicted in the drawings), the head unit 38, the platen 51, etc.

The head unit 38 is positioned at the downstream side in the conveyance orientation 8A with respect to the conveying roller pair 36 and above the conveying path 43. The head unit 38 has a head module 49 having a plurality of nozzles 38A. From the plurality of nozzles 38A, an ink suppled from the ink sub-tank 47 is discharged or ejected downward toward the sheet S supported by the conveying belt 101. With this, an image is recorded on the sheet S.

The platen 51 is positioned at the downstream side in the conveyance orientation 8A with respect to the conveying roller pair 36 and below the conveying path 43. The platen 51 faces the head unit 38, at a position below the head unit 38. The platen 51 has a conveying belt 101 and a supporting part 104. The conveying belt 101 supports the sheet S conveyed by the conveying roller pair 36 in the conveying orientation 8A and positioned immediately below the head unit 38. The conveying belt 101 conveys the sheet S supported thereby in the conveying orientation 8A.

The installment case 110 is positioned in the vicinity of a front end and a lower end of the lower casing 32, and has a box shape which is opened frontward. The ink tank 34 is inserted reward into the installment case 110. An ink needle 112 extending frontward is positioned in a rearward end surface 111 of the installment case 110. A front end of the ink needle 112 is opened, and a rear end of the ink needle 112 is connected to an ink tube 113. The ink tube 113 connects an internal space of the ink needle 112 and an internal space 47A of the ink sub-tank 47 so that the ink is capable of flowing between the internal space of the ink needle 112 and the internal space 47A of the ink sub-tank 47. In a case that the ink tank 34 is installed in the installment case 110, the ink needle 112 is inserted into an outflow port (not depicted in the drawings) of the ink tank 34. With this, the ink stored in the ink tank 34 is supplied to the ink sub-tank 47, via the ink needle 112 and the ink tube 113. An ink replenishing valve 114 which is capable of opening and closing a flow channel of the ink tube 113 is arranged in the ink tube 113. The opening and closing of the ink replenishing valve 114 is controlled by a non-depicted controller.

The ink tank 34 stores an ink. The ink is a liquid containing water, resin fine particles dispersed in the water, a pigment, etc. The ink has a viscosity suitable for uniformly dispersing the pigment. The pigment is the color of the ink. In a case that the ink is consumed, the ink tank 34 is detached from the installment case 110, and is replaced with a new ink tank 34 storing the ink.

The ink sub-tank 47 is positioned above the ink tank 34. The ink sub-tank 47 stores the ink supplied from the ink tank 34. A supply pipe 61, a return pipe 62 and an atmosphere communication pipe 64 are connected to the ink sub-tank 47. The supply pipe 61 and the return pipe 62 connect the ink sub-tank 47 and the head unit 38 so that the ink can be flow between the ink sub-tank 47 and the head unit 38. Each of the supply pipe 61 and the return pipe 62 is a circular pipe (tube) of which inner diameter is constant. An end of the atmosphere communication pipe 64 is opened in an upper part of the internal space 47A of the ink sub-tank 47, and the other end of the atmosphere communication pipe 64 is opened in the internal space 31A of the upper casing 31.

A positive pressure pump 63 is arranged in the supply pipe 61. In the supply pipe 61, the positive pressure pump 63 applies a pressure to the ink in an orientation toward the head unit 38. The positive pressure pump 63 is exemplified, for example, by a diaphragm pump. The non-depicted controller controls the driving of the positive pressure pump 63. The positive pressure pump 63 is an example of a "pump".

A negative pressure pump 65 is arranged in the atmosphere communication pipe 64. The negative pressure pump 65 sucks the air in the internal space 47A of the ink sub-tank 47 to thereby depressurize the internal space 47A of the ink sub-tank 47. The negative pressure pump 65 is exemplified, for example, by a diaphragm pump. The air sucked by the negative pressure pump 65 is exhausted (discharged) to the atmosphere via the atmosphere communicating pipe 64. The non-depicted controller controls the driving of the negative pressure pump 65.

A filter 66 is arranged in the supply pipe 61. The filter 66 is positioned between the positive pressure pump 63 and the head unit 38. Note that in the depiction in FIG. 2, the arrangement of the filter 66 is simplified.

Figure 3:
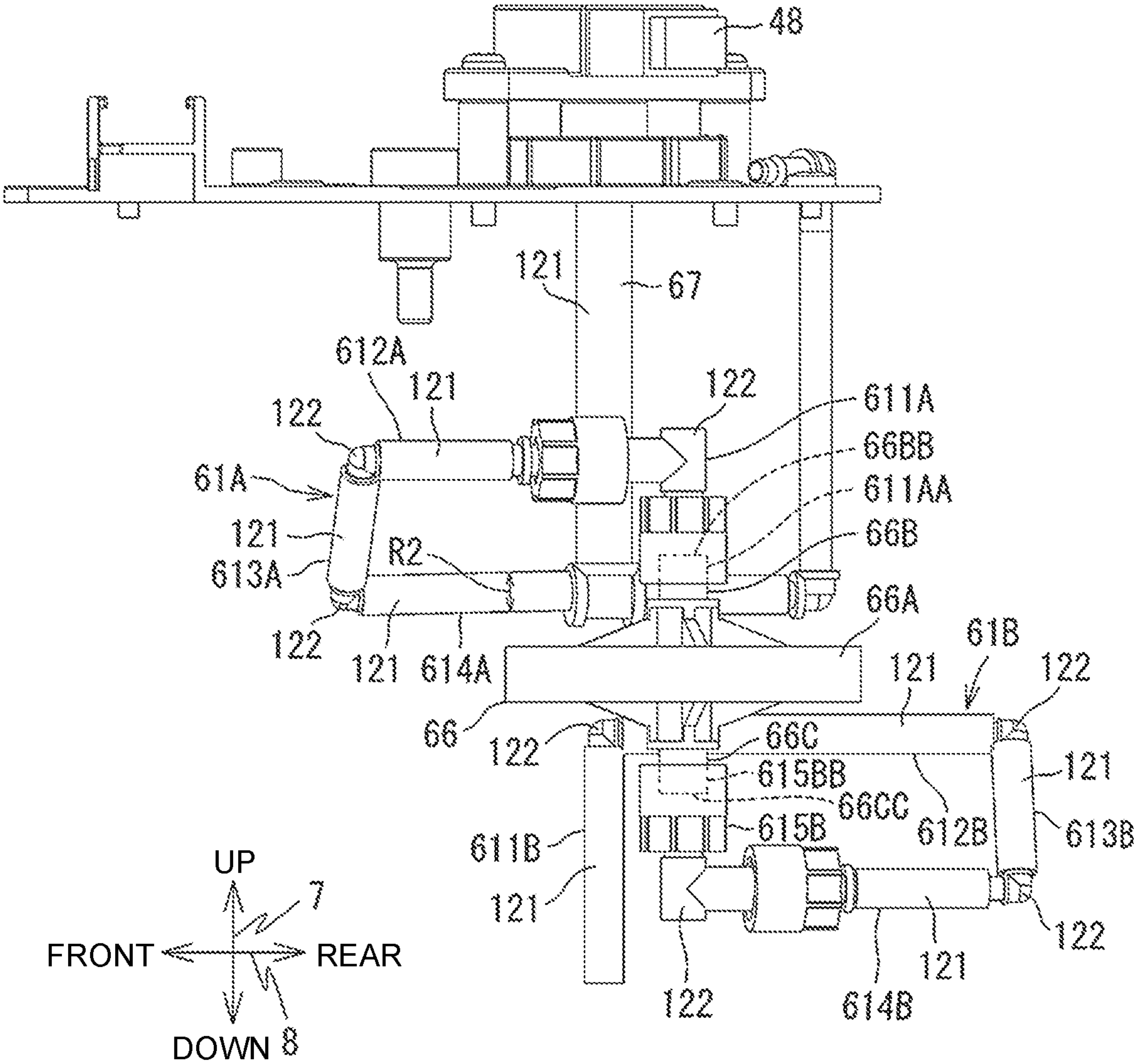
FIG. 3 is a perspective view depicting an area, of a supply pipe 61, including a filter 66 and surrounding thereof.

As depicted in FIG. 3, the filter 66 includes a housing 66A having a circular-cylindrical shape extending in the up-down direction 7, an outflow port 66B extending upward from an upper end of the housing 66A, and an inflow port 66C extending downward from a lower end of the housing 66A. In the internal space of the housing 66A, for example, a filter member of a mesh type having a plurality of holes each having a predetermined inner diameter is accommodated. The outflow port 66B is opened upward. The inner diameter of the outflow port 66B is smaller than the inner diameter of the housing 66A. The inflow port 66C is opened downward. The inner diameter of the inflow port 66C is smaller than the inner diameter of the housing 66A. In a case that the ink flowed upward into the internal space of the housing 66A from the inflow port 66C passes the filter member, a solid contained in the ink and greater than the inner diameter of each of the holes of the filter member is caught by the filter member. This suppresses any flowing of the solid contained in the ink into the head unit 38.

As depicted in FIG. 2 and FIG. 3, the supply pipe 61 includes a first connecting part 61A connected to the outflow port 66B of the filter 66 and a second connecting part 61B connected to the inflow port 66C of the filter 66. The first connecting part 61A and the second connecting part 61B are formed by tubes 121 constructing linear parts and pipe joints 122 constructing curved or bent parts such that the channels are disposed by those parts.

Specifically, the first connecting part 61A includes a first connection part 611A, a first frontward part 612A, a first downward part 613A and a first rearward part 614A. The first connection part 611A is connected to the outflow port 66B of the filter 66. The first connection part 611A extends upward from the outflow port 66B. The first frontward part 612A extends frontward from an upper end part of the first connection part 611A. The first downward part 613A extends downward from a front-end part of the first frontward part 612A down to a position below an opening end 66BB of the outflow port 66B.

Figure 4:
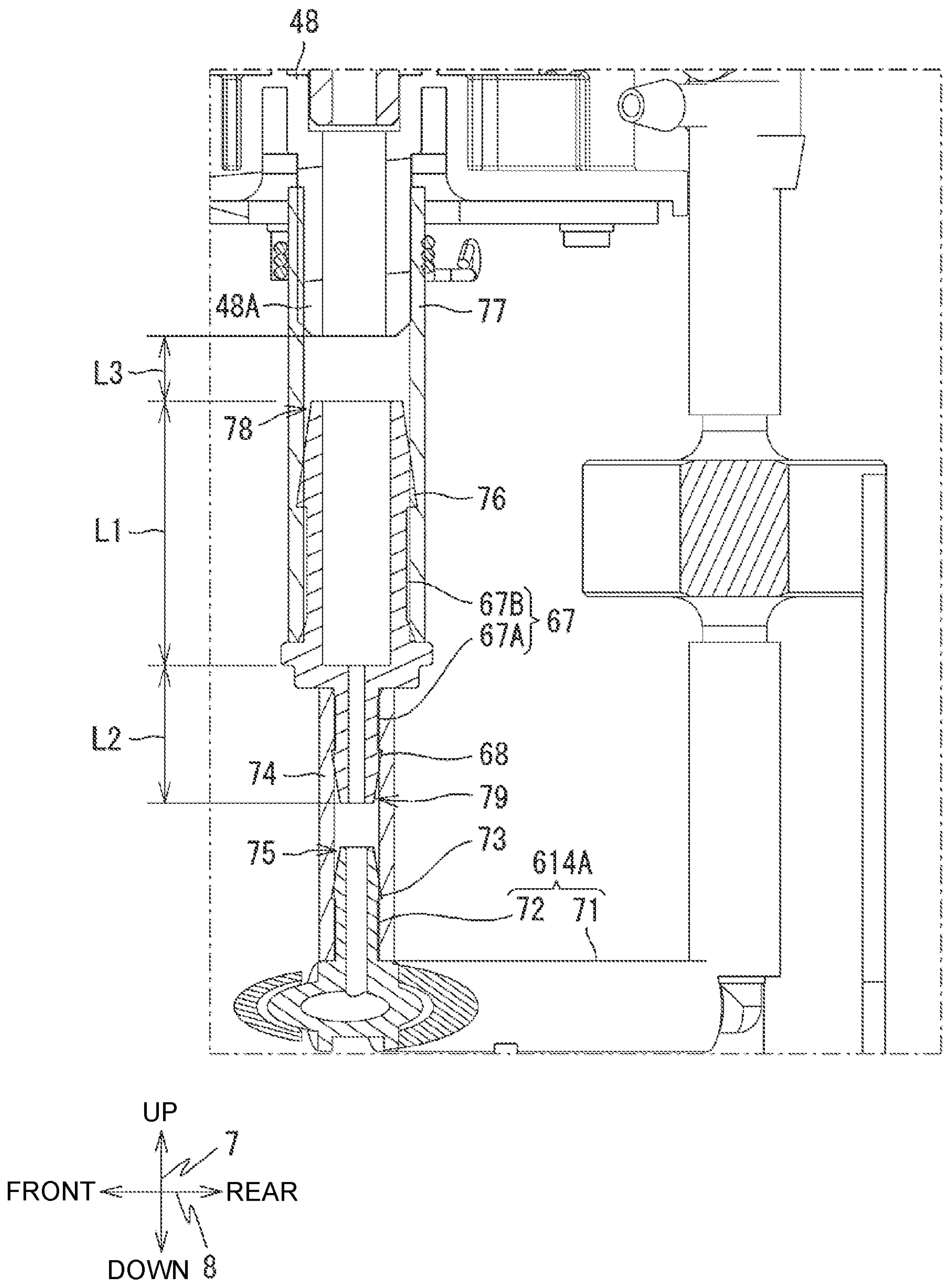
FIG. 4 is a vertical cross-sectional view depicting an area, of the supply pipe 61, including a branching pipe 67 and surrounding thereof.

As depicted in FIG. 3 and FIG. 4, the first rearward part 614A includes a straight part 71 and a branching connecting part 72. The straight part 71 extends rearward from a lower end part of the first downward part 613A. The branching connecting part 72 is positioned at a substantially center in the front-rear direction 8 of the first rearward part 614A. The branching connecting part 72 has a circular-cylindrical shape extending upward from an upper end of the straight part 71. An internal space of the branching connecting part 72 is communicated with an internal space of the straight part 71. A branching cross-sectional area of the internal space of the branching connecting part 72 is smaller than a straight cross-sectional area of the internal space of the straight part 71. With this, in a case that the ink flows into the internal space of the branching connecting part 72, the ink is more likely to raise in the internal space of the branching connecting part 72. A meniscus by the ink is easily formed in the internal space of the branching connecting part 72. The branching cross-sectional area is an area of a cross section obtained by cutting the branching connecting part 72 by a plane orthogonal to a pipe axis of the branching connecting part 72. The straight cross-sectional area is an area of a cross section obtained by cutting the straight part 71 by a plane orthogonal to a pipe axis of the straight part 71. An upper end of the branching connecting part 72 is opened upward.

The branching connecting part 72 has a first tapered part 73. The first tapered part 73 is positioned at an outer circumferential surface in the upper end part of the branching connecting part 72. An outer diameter of the first tapered part 73 is reduced upward. The branching connecting part 72 is fitted to an inner periphery of a first tube 74 which has a circular-cylindrical shape and of which both ends are opened. With this, the first tapered part 73 bites into an inner circumferential surface of the first tube 74, thereby making the first tube 74 to be less likely to be detached from the branching connecting part 72. There is a first gap 75 between an outer circumferential surface of the first tapered part 73 and the inner circumferential surface of the first tube 74. The branching connecting part 72 is connected to the branching pipe 67 via the first tube 74.

The branching pipe 67 is a pipe having a circular-cylindrical shape extending along the up-down direction 7. The branching pipe 67 includes a lower tube part 67A and an upper tube part 67B. The lower tube part 67A is positioned at a lower end of the upper tube part 67B. The lower tube part 67A is a cylindrical pipe having a constant inner diameter. The lower tube part 67A has a second tapered part 68. The second tapered part 68 is positioned at an outer circumferential surface in a lower end part of the lower tube part 67A. An outer diameter of the second tapered part 68 is reduced downward. The lower tube part 67A is fitted to the inner periphery of the first tube 74. With this, the second tapered part 68 bites into the inner circumferential surface of the first tube 74, thereby making the lower tube part 67A to be less likely to be detached from the first tube 74. There is a second gap 79 between an outer circumferential surface of the second tapered part 68 and the inner circumferential surface of the first tube 74. The internal space of the lower tube part 67A is communicated with the internal space of the branching connecting part 72, via the internal space of the first tube 74. A lower cross-sectional area of the internal space of the lower tube part 67A is equal to the branching cross-sectional area. In other words, the lower cross-sectional area of the internal space of the lower tube part 67A is smaller than the straight cross-sectional area. With this, the ink is more likely to raise, by the capillary phenomenon, and the meniscus by the ink is more likely to be formed in the internal space of the lower tube part 67A and the internal space of the branching connecting part 72. The lower cross-sectional area is an area of a cross section obtained by cutting the lower tube part 67A by a plane orthogonal to a pipe axis of the lower tube part 67A. The lower cross-sectional area is an example of a “second cross-sectional area”. The straight cross-sectional area is an example of a “fourth cross-sectional area”. Note that the branching pipe 67 is an example of a “pipe”. Further, the combination of the branching pipe 67, the branching connecting part 72 and the first tube 74 is another example of the “pipe”. The lower tube part 67A is an example of a “first part”. The combination of the lower tube part 67A, the first tube 74 and the branching connecting part 72 is an example of “lower tube part”.

The upper tube part 67B is continuous with the lower tube part 67A. The upper tube part 67B is positioned at an upper end of the lower tube part 67A. The upper tube part 67B is a cylindrical pipe of which inner diameter is constant. An internal space of the upper tube part 67B is communicated with the internal space of the lower tube part 67A. An upper cross-sectional area of the internal space of the upper tube part 67B is greater than the lower cross-sectional area of the internal space of the lower tube part 67A. With this, in the internal space of the upper tube part 67B, the change (fluctuation) of a liquid surface of the ink is smaller than in the internal space of the lower tube part 67A. The upper cross-sectional area is a cross-sectional area obtained by cutting the upper tube part 67B by a plane orthogonal to a pipe axis of the upper tube part 67B. A pipe length L1 of the upper tube part 67B is longer than a pipe length L2 of the lower tube part 67A. In other words, the pipe length L2 of the lower tube part 67A is shorter than the pipe length L1 of the upper tube part 67B. The pipe length L1 of the upper tube part 67B is a length along the pipe axis of the upper tube part 67B. Note that the pipe length L1 of the upper tube part 67B is preferably set to be a length which is minimally required for connection with respect to a second tube 77 (to be described later on) or to a pressure sensor 48 (to be described later on). The pipe length L2 of the lower tube part 67A is a length along the pipe axis of the lower tube part 67A. The upper cross-sectional area is an example of a "first cross-sectional area".

The upper tube part 67B has a third tapered part 76. The third tapered part 76 is positioned at an outer circumferential surface in an upper end part of the upper tube part 67B. An outer diameter of the third tapered part 76 is reduced upward. The upper tube part 67B is fitted to an inner periphery of a second tube 77 which has a circular-cylindrical shape and of which both ends are opened. With this, the third tapered part 76 bites into the inner circumferential surface of the second tube 77, thereby making the upper tube part 67B to be less likely to be detached from the second tube 77. There is a third gap 78 between an outer circumferential surface of the third tapered part 76 and the inner circumferential surface of the second tube 77. An upper end part of the second tube 77 is fitted to an outer periphery of a connecting tube part 48A of the pressure sensor 48. A tube cross-sectional area of an internal space of the second tube 77 is greater than the upper cross-sectional area of the upper tube part 67B. The tube cross-sectional area is an area of a cross section obtained by cutting the second tube 77 by a plane orthogonal to a pipe axis of the second tube 77. A pipe length L3 of the second tube 77 is shorter than the pipe length L1 of the upper tube part 67B. The pipe length L3 of the second tube 77 is a length of a part, of the second tube 77, between the upper end of the upper tube part 67B and a lower end of the connecting tube part 48A along the pipe axis of the second tube 77. The pipe length L1 of the upper tube part 67B is a length along the pipe axis of the upper tube part 67B. The third taper part 76 is an example of a "tapered part". The second tube 77 is an example of a "tube". The tube cross-sectional area is an example of a "third cross-sectional area".

The pressure sensor 48 is connected to the upper tube part 67B via the second tube 77. The pressure sensor 48 is configured to detect a pressure of the air inside the upper tube part 67B of the branching pipe 67 and to output a detection signal to the non-depicted controller.

The second connecting part 61B includes an upward part 611B, a second rearward part 612B, a second downward part 613B, a second frontward part 614B and a second connection part 615B. The upward part 611B extends upward, at a position in front of the inflow port 66C of the filter 66, from a position below an opening end 66CC of the inflow port 66C up to a position above the opening end 66CC of the inflow port 66C. The second rearward part 612B extends rearward from an upper end part of the upward part 611B. The second downward part 613B extend downward from a rear end part of the second rearward part 612B down to a position below the opening end 66CC of the inflow port 66C. The second frontward part 614B extends frontward from the lower end part of the second downward part 613B up to a position overlapping with the inflow port 66C in the up-down direction 7. The second connection part 615B extends upward from a front-end part of the second frontward part 614B and is connected to the inflow port 66C.

<Image Recording Operation>

Next, an explanation will be given about an operation of the image recording apparatus 100 in a case that an image is recorded on a sheet S drawn from the roll body 37.

In a case that the controller receives a command of recording an image on the sheet S, from the operation panel 44 or from an external apparatus or device such as an information processing apparatus which is connected to the image recording apparatus 100 by a LAN, etc., the controller drives the positive pressure pump 63 and the negative pressure pump 65. With this, the ink circulates through the supply pipe 61 and the return pipe 62 due to a pressure difference between the ink sub-tank 47 and the head unit 38. In this situation, the ink flows in the upward part 611B, the second rearward part 612B, the second downward part 613B, the second frontward part 614B and the second connection part 615B of the second connecting part 61B in this order and passes through the second connecting part 61B. The ink which passed through the second connecting part 61B flows upward into the inside of the housing 66A, from the inflow port 66C of the filter 66, and flows upward out of the outflow port 66B.

The ink which has passed the inside of the filter 66 flows in the first connection part 611A, the first frontward part 612A, the first downward part 613A and the first rearward part 614A of the first connecting part 61A in this order and passes through the first connecting part 61A. In this situation, since the ink is more likely to be raised in the branching connecting part 72 and the lower tube part 67A, in a case that the ink flows from the straight part 71 of the first rearward part 614A into the branching connecting part 72, this ink easily reaches the upper tube part 67B via the branching connecting part 72, the first tube 74 and the lower tube part 67A. Accordingly, there arises such a possibility that the ink might make contact with the pressure sensor 48.

However, since the upper cross-sectional area of the internal space of the upper tube part 67B is greater than the lower cross-sectional area of the internal space of the lower tube part 67A, the ink is less likely to be raised in the internal space of the upper tube part 67B. Since the ink is less likely to be raised up to the upper end of the upper tube part 67B, thereby making the ink to be less likely to make contact with the pressure sensor. Further, this also suppresses any entrance or inflow of the ink to the third gap 78 between the outer circumferential surface of the third tapered part 76 and the inner circumferential surface of the second tube 77.

The ink which has reached the head unit 38 is discharged or ejected from the plurality of nozzles 38A toward the sheet S supported by the platen 51. With this, the image is recorded on the sheet S. The sheet S having the image recorded thereon is cut, by a cutter, etc., into a predetermined size and is discharged from the discharge port 33.

In this situation, in a case that the pressure inside the supply pipe 61 is lowered due to the consumption of the ink and/or the pulsation of the positive pressure pump 63, etc., the liquid surface of the ink positioned in the internal space of the upper tube part 67B might be lowered. However, the change of the liquid surface of the ink is small in the internal space of the upper tube part 67B, and thus the liquid surface of the ink is maintained in the internal space of the upper tube part 67B. Accordingly, since the liquid surface of the ink is less likely to be lowered than the upper end of the branching connecting part 72, the ink is less likely to be left in the gap (the first gap 75) between the outer circumferential surface of the first tapered part 73 and the inner circumferential surface of the first tube 74.

In a case that the image is recorded on a predetermined number of the sheet S, the positive pressure pump 63 and the negative pressure pump 65 are stopped, and the image recording processing is ended. In this situation, the liquid surface of the ink might be greatly lowered due to the pressure, inside the supply pipe 61, which is being lowered greatly. However, since the meniscus by the ink is easily formed in the internal space of the lower tube part 67A and the internal space of the branching connecting part 72, the ink is maintained (held) in the internal space of the lower tube part 67A and the internal space of the branching connecting part 72. Due to this, there is provided such a state that the ink is always filled in the internal space of the lower tube part 67A and the internal space of the branching connecting part 72, and thus the ink is less likely to be left in the first gap 75 between the outer circumferential surface of the first tapered part 73 and the inner circumferential surface of the first tube 74.

<Effects of Embodiment>

In the image recording apparatus 100, since the upper cross-sectional area of the internal space of the upper tube part 67B is greater than the lower cross-sectional area of the internal space of the lower tube part 67A, the change of the liquid surface of the ink due to the pressure change in the internal space of the supply pipe is small in the internal space of the upper tube part 67B. Due to this, even in a case that the pressure in the internal space of the supply pipe 61 becomes great, which in turn raises the liquid surface of the ink in the internal space of the branching pipe 67, this ink is less likely to make contact with the pressure sensor 48. Since the lower cross-sectional area of the internal space of the lower tube part 67A is smaller than the upper cross-sectional area of the internal space of the upper tube part 67B, the liquid surface of the ink is more likely to be raised up to the position of the upper tube part 67B due to the capillary phenomenon. Due to this, even in a case that the pressure inside the supply pipe 61 is lowered and thus the liquid surface of the ink is lowered, the liquid surface of the ink is less likely to be lowered down to the position below the upper end of the branching connecting part 72, and thus the ink is less likely to be left in the first gap 75 between the outer circumferential surface of the first tapered part 73 and the inner circumferential surface of the first tube 74. Accordingly, there arises less such a situation that the ink left in the first gap 75 is solidified and that the solidified ink peels off by making contact with the ink newly supplied next time and flows toward the head unit 38 together with the new ink, and thus the solidified ink is less likely to close or clog the channel in which the ink flows in the head unit 38.

In the image recording apparatus 100, the pressure sensor 48 is connected to the upper tube part 67B via the second tube 77 fitted to the outer periphery of the third tapered part 76. Accordingly, the branching pipe 67 is easily connected to the pressure sensor 48. In a case that the upper tube part 67B is pulled downward with respect to the second tube 77, the third tapered part 76 bites deeply into the inner circumferential surface of the second tube 77, and thus the ink is less likely to leak from the position between the second tube 77 and the upper tube part 67B. Since the third gap 78 is defined between the inner circumferential surface of the second tube 77 and the outer circumferential surface of the third tapered part 76, if the liquid surface of the ink is changed while straddling the upper end of the upper tube part 67B, there arises such a problem that the ink is more likely to be left in the third gap 78. However, in the internal space of the upper tube part 67B, since the change of the liquid surface of the ink is small, the ink is less likely to reach the upper end of the upper tube part 67B even in a case that the pressure inside the internal space of the supply pipe 61 becomes to be great. Thus, the ink is less likely to be left in the third gap 78.

In the image recording apparatus 100, the tube cross-sectional area of the internal space of the second tube 77 is greater than the upper cross-sectional area of the internal space of the upper tube part 67B. Due to this, in the internal space of the second tube 77, the change of the liquid surface of the ink is smaller than in the internal space of the upper tube part 67B. Accordingly, even in a case that the pressure in the internal space of the supply pipe 61 becomes great, the ink is less likely to make contact with the pressure sensor 48.

In the image recording apparatus 100, since the pipe length L3 of the second tube 77 is shorter than the pipe length L1 of the upper tube part 67B, the size of the image recording apparatus 100 can be easily made small, while suppressing any contact of the ink with respect to the pressure sensor 48.

In the image recording apparatus 100, since the pipe length L2 of the lower tube part 67A is shorter than the pipe length L1 of the upper tube part 67B, the liquid surface of the ink is more likely to be present in the internal space of the upper tube part 67B. Even in a case that an air bubble enters into the lower tube part 67A, the air bubble is less likely to remain in the internal space of the lower tube part 67A.

In the image recording apparatus 100, the lower cross-sectional area of the lower tube part 67A is smaller than the straight cross-sectional area of the supply pipe 61. Accordingly, since the ink is more likely to be raised in the internal space of the lower tube part 67A, the liquid surface of the ink is likely to present in the internal space of the upper tube part 67B.

In the image recording apparatus 100, since the ink contains the water and the resin fine particles dispersed in the water, the ink is more likely to be solidified due to being dried. Accordingly, if the ink is left in the first gap 75 between the outer circumferential surface of the first tapered part 73 and the inner circumferential surface of the first tube 74, a solidified ink is more likely to be generated. In the image recording apparatus 100, since the ink is less likely to be left in the first gap 75, thereby effectively suppressing the occurrence of such a situation that the solidified ink might peel off by making contact with the ink newly supplied next time and might flow toward the head unit 38 together with the new ink and that the solidified ink might close or clog the channel in the head unit 38.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the branching pipe 67 is the cylindrical pipe in the image recording apparatus 100, the branching pipe 67 is not limited or restricted by being a cylindrical pipe provided that the branching pipe 67 is connectable to the pressure sensor 48 and the supply pipe 61. For example, the branching pipe 67 may be a rectangular pipe.

Although the branching connecting part 72 has the first tapered part 73 in the image recording apparatus 100, the first tapered part 73 may be omitted provided that the branching connecting part 72 is connectable to the first tube 74.

Although the upper tube part 67B has the third tapered part 76 in the image recording apparatus 100, the third tapered part 76 may be omitted provided that the upper tube part 67B is connectable to the second tube 77.

Figure 5:
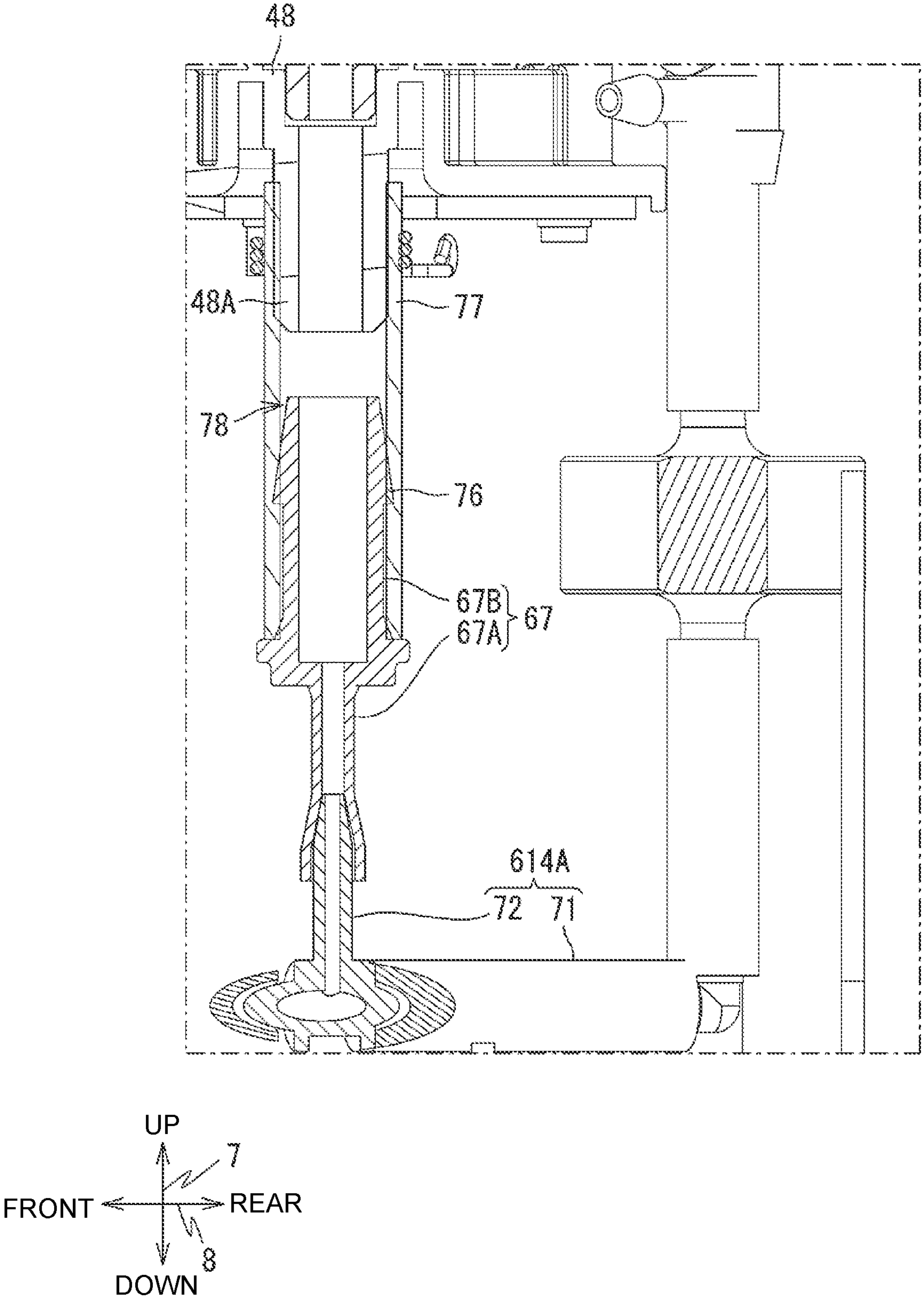
FIG. 5 is a vertical cross-sectional view depicting a state that a lower tube 67A is directly connected to a branching connecting part 72.

Although the lower tube part 67A is connected to the branching connecting part 72 via the first tube 74 in the image recording apparatus 100, the lower tube part 67A may be directly connected to the branching connecting part 72, as depicted in FIG. 5. In this case, the first tube 74 is omitted. Further, in this case, the branching connecting part 72 is, for example, a male luer fitting. The lower tube part 67A is, for example, a female luer fitting. The branching connecting part 72 is pressed into the internal space of the lower tube part 67A from therebelow, to thereby be connected to the lower tube part 67A. In this case, the cross-sectional area of a pipe channel is the lower cross-sectional area (the second cross-sectional area) over an entire area between the supply pipe 61 and the upper tube part 67B.

Figure 6:
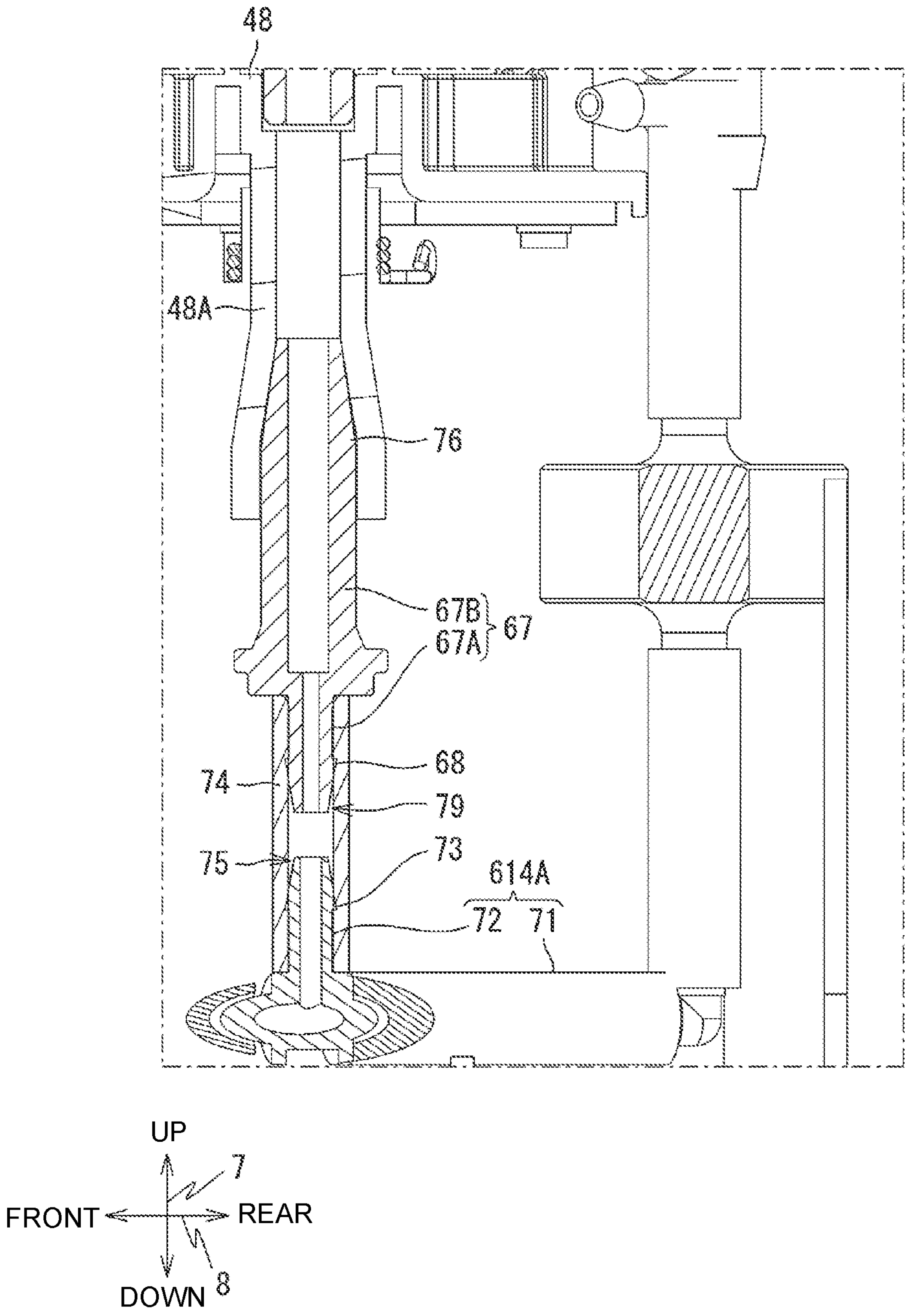
FIG. 6 is a vertical cross-sectional view depicting a state that an upper tube 67B is directly connected to a connecting tube part 48A.

Although the upper tube part 67B is connected to the connecting tube part 48A of the pressure sensor 48 via the second tube 77 in the image recording apparatus 100, the upper tube part 67B may be directly connected to the connecting tube part 48A, as depicted in FIG. 6. In this case, the second tube 77 is omitted. Further, in this case, the upper tube part 67B is, for example, a male luer fitting. The connecting tube part 48A is, for example, a female luer fitting. The upper tube part 67B is pressed into the internal space of the connecting tube part 48A from therebelow, to thereby be connected to the connecting tube part 48A. Note that both of the first tube 74 and the second tube 77 may be omitted.

Although the tube cross-sectional area of the internal space of the second tube 77 is greater than the upper cross-sectional area of the internal space of the upper tube part 67B in the image recording apparatus 100, the tube cross-sectional area of the internal space of the second tube 77 at a part positioned above the upper end of the upper tube part 67B may be smaller than the upper cross-sectional area, for example.

Although the second tube 77 is fitted to the outer periphery of the upper tube part 67B in the image recording apparatus 100, the second tube 77 may be fitted to the inner periphery of the upper tube part 67B. In this case, the tube cross-sectional area of the internal space of the second tube 77 is made smaller than the upper cross-sectional area of the internal space of the upper tube part 67B.

Although the pipe length L3 of the second tube 77 is shorter than the pipe length L1 of the upper tube part 67B in the image recording apparatus 100, the pipe length L3 of the second tube 77 may be longer than the pipe length L1 of the upper tube part 67B.

Although the pipe length L2 of the lower tube part 67A is shorter than the pipe length L1 of the upper tube part 67B in the image recording apparatus 100, the pipe length L2 of the lower tube part 67A may be longer than the pipe length L1 of the upper tube part 67B.

Although the lower cross-sectional area of the internal space of the lower tube part 67A is smaller than the straight cross-sectional area of the internal space of the supply pipe 61 in the image recording apparatus 100, the lower cross-sectional area of the internal space of the lower tube part 67A may be greater than the straight cross-sectional area of the internal space of the supply pipe 61, provided that the lower cross-sectional area of the internal space of the lower tube part 67A is smaller than the upper cross-sectional area of the internal space of the upper tube part 67B.

Although the ink contains the water and the resin fine particles dispersed in the water in the image recording apparatus 100, the ink may not contain the resin fine particles.

What is claimed is:

1. An ink discharging apparatus comprising:
- a tank configured to store an ink;
- a head configured to discharge the ink supplied from the tank;
- a supply pipe connecting the tank and the head;
- a pump arranged in the supply pipe, the pump being configured to transfer the ink from the tank to the head;
- a pipe branching upward from the supply pipe; and
- a pressure sensor connected to an upper end part of the pipe,
- wherein the pipe has an upper tube part and a lower tube part continuous with the upper tube part; and
- a first cross-sectional area of an internal space of the upper tube part is greater than a second cross-sectional area of an internal space of the lower tube part.

2. The ink discharging apparatus according to claim 1, wherein the lower tube part extends over an entire area between the supply pipe and the upper tube part; and a cross-sectional area of the internal space of the lower tube part is smaller than the first cross-sectional area in the entire area between the supply pipe and the upper tube part.

3. The ink discharging apparatus according to claim 2, wherein the cross-sectional area of the internal space of the lower tube part is the second cross-sectional area in the entire area between the supply pipe and the upper tube part.

4. The ink discharging apparatus according to claim 1, wherein the upper tube part has a tapered part which is positioned at an upper end part of the upper tube part and of which outer diameter is reduced upward; and
- the pressure sensor is connected to the upper tube part via a tube fitted to an outer periphery of the tapered part.

5. The ink discharging apparatus according to claim 4, wherein a third cross-sectional area of an internal space of the tube is greater than the first cross-sectional area.

6. The ink discharging apparatus according to claim 5, wherein a pipe length of the tube is shorter than a pipe length of the upper tube part.

7. The ink discharging apparatus according to claim 6, wherein the lower tube part has a first part integrally formed with the upper tube part, and a connecting part connecting the first part and the supply pipe; and a pipe length of the first part is shorter than the pipe length of the upper tube part.

8. The ink discharging apparatus according to claim 7, wherein the second cross-sectional area is smaller than a fourth cross-sectional area of an internal space of the supply pipe.

9. The ink discharging apparatus according to claim 1, wherein the ink includes a water and resin fine particles dispersed in the water.

* * * * *